(12) United States Patent
Salmon

(10) Patent No.: US 8,803,007 B2
(45) Date of Patent: Aug. 12, 2014

(54) CASSU-GUARD

(76) Inventor: Carl Anthony Salmon, Brooklyn, NY (US)

( * ) Notice: Subject to any disclaimer, the term of this patent is extended or adjusted under 35 U.S.C. 154(b) by 319 days.

(21) Appl. No.: 12/794,754

(22) Filed: Jun. 6, 2010

(65) Prior Publication Data

US 2011/0297421 A1    Dec. 8, 2011

(51) Int. Cl.
| | | |
|---|---|---|
| H02G 3/18 | (2006.01) | |
| H01H 9/02 | (2006.01) | |
| H01H 13/04 | (2006.01) | |
| H01H 19/04 | (2006.01) | |
| H01H 21/04 | (2006.01) | |
| H01H 23/04 | (2006.01) | |
| H01R 13/46 | (2006.01) | |
| H02G 3/08 | (2006.01) | |
| H01R 4/24 | (2006.01) | |
| H01R 4/26 | (2006.01) | |
| H01R 11/20 | (2006.01) | |

(52) U.S. Cl.
USPC ............. 174/659; 174/53; 220/3.2; 439/400

(58) Field of Classification Search
CPC .......... H02G 3/08; H02G 3/083; H02G 3/085
USPC .......... 174/53, 62, 63, 66, 480, 660, 663, 58, 174/DIG. 2, 659; 220/3.2, 3.3, 3.6, 3.7; D13/152, 156; 439/400
See application file for complete search history.

(56) References Cited

U.S. PATENT DOCUMENTS

| | | | | | |
|---|---|---|---|---|---|
| 3,378,160 | A | * | 4/1968 | Bassani ........................... | 174/58 |
| 3,482,032 | A | * | 12/1969 | McVoy, Jr. .................... | 174/659 |
| 3,684,819 | A | * | 8/1972 | Wilson ........................... | 174/53 |
| 3,876,821 | A | * | 4/1975 | Pringle ......................... | 220/3.2 |
| 3,970,772 | A | * | 7/1976 | Ballard ........................ | 174/53 |
| 4,335,271 | A | * | 6/1982 | Haslbeck ..................... | 174/661 |
| 4,389,535 | A | * | 6/1983 | Slater et al. .................. | 174/666 |
| 4,529,834 | A | * | 7/1985 | Nattel ............................. | 174/53 |
| 4,626,962 | A | * | 12/1986 | Ahn et al. ..................... | 361/758 |
| 4,685,581 | A | * | 8/1987 | Kaneda et al. ................ | 220/3.2 |
| D295,168 | S | * | 4/1988 | Pisciotta ..................... | D13/156 |
| 4,757,908 | A | * | 7/1988 | Medlin, Sr. ................... | 220/3.9 |
| 5,594,208 | A | * | 1/1997 | Cancellieri et al. ............ | 174/58 |
| D466,085 | S | * | 11/2002 | Heggem ...................... | D13/152 |
| 6,664,477 | B2 | * | 12/2003 | Fortin ........................ | 174/138 F |
| 6,840,800 | B2 | * | 1/2005 | Kidman ......................... | 174/66 |
| 6,969,277 | B2 | * | 11/2005 | Shackelford et al. ......... | 439/521 |
| 2005/0194172 | A1 | * | 9/2005 | Ungerman et al. ............ | 174/58 |

* cited by examiner

*Primary Examiner* — Chau N Nguyen
*Assistant Examiner* — Roshn Varghese
(74) *Attorney, Agent, or Firm* — Craige Thompson; Thompson Patent Law

(57) ABSTRACT

The Cassu-guard is electrical safety apparatus that is created to prevent electrical shortage, shock & movement of broken wires and eliminate the use of electrical tape in insulating socket outlets and light switches when installing these devices in metallic boxes.

10 Claims, 6 Drawing Sheets

CASSU-GUARD

TECHNICAL FIELD AND INDUSTRIAL APPLICABILITY OF THE INVENTION

The Cassu-guard is electrical safety apparatus that is created to prevent electrical shortage, shock & movement of broken wires and eliminate the use of electrical tape in insulating socket outlets and light switches when installing these devices in metallic boxes.

BACKGROUND OF THE INVENTION

For years electrical tradesmen have to deal with the risks of installing electrical sockets and light switches in metallic boxes were the wires tend to get loose after installation.

This problems which usually the result of electrical wires getting loose or break over a period of time by usage, abuse or corrosion from the environmental surrounding, hence resulting in someone getting an electric shock which sometimes result in fatality or electrical fire which result in the lost of property.

In some building codes its required whenever on electrical sockets or light switches are to be install in any electrical metallic boxes that these electrical devices to be insulated by the wrapping of electrical tape around these devices to act as an insulating protective guard before placing these devices in these metallic boxes.

This method work for a short period of time were the electrical tape lose its adhesiveness and its insulating ability leaving the hidden danger in the walls of individual households, businesses, factories, and other properties.

The cassu-guard was invented for purposes of solving all these problems with simple, reliable, cost effective, time saving and long term solution of having a simple electrical safety apparatus that provide high and permanent insulation, hold wires in place if broken or loose from the screws, inspect without having to remove the electrical tape to see if the wires are properly connected, and able to carry out testing without removing the cassu-guard.

DETAILED DESCRIPTION OF THE PREFERRED EMBODIMENT OF THE INVENTION

Figure 1:
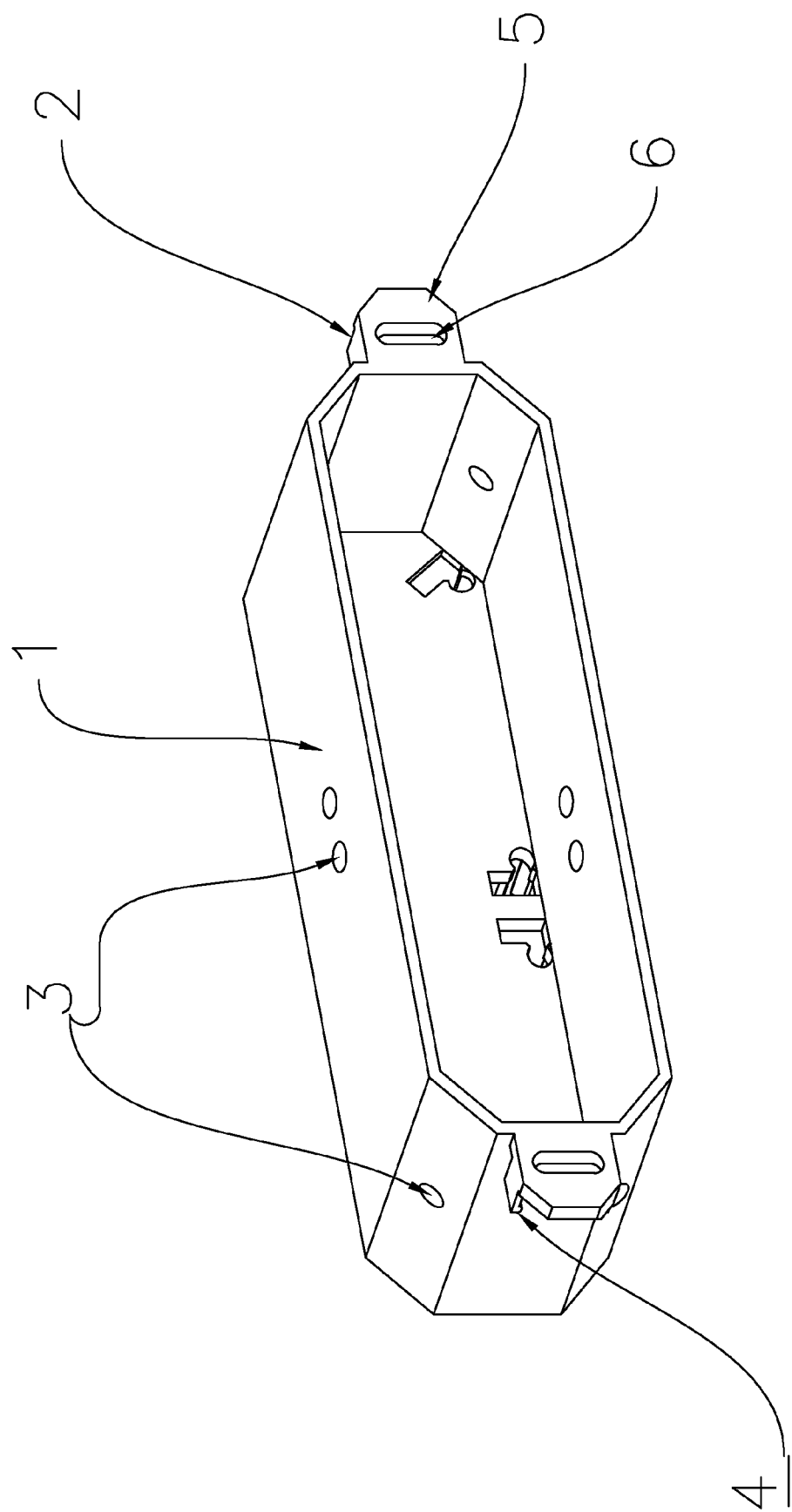
FIG. 1 depict the appearance of the an embodiment according to the invention.
Figure 2:
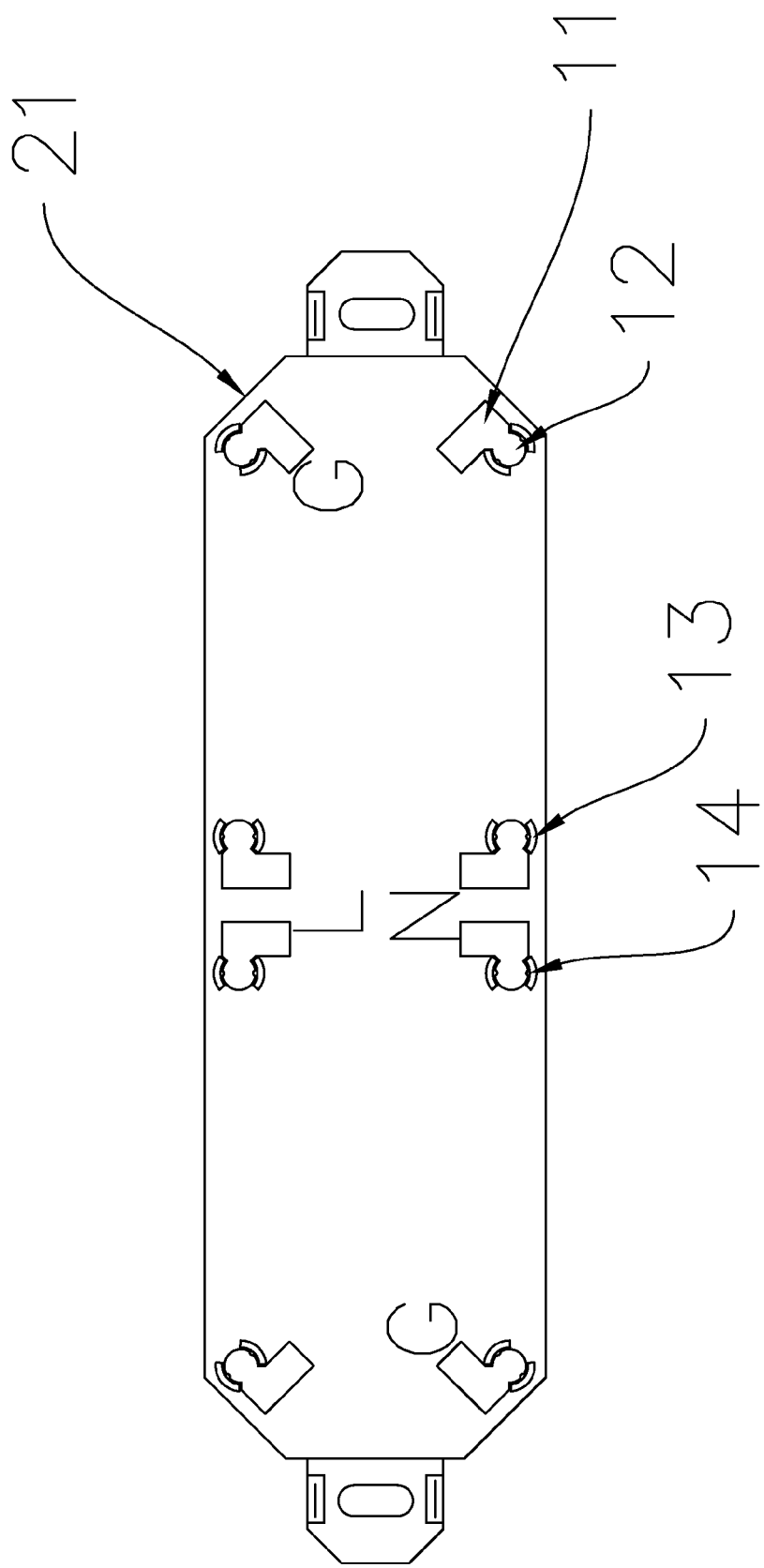
FIG. 2 depict the back view of the embodiment according to the invention.
Figure 3:
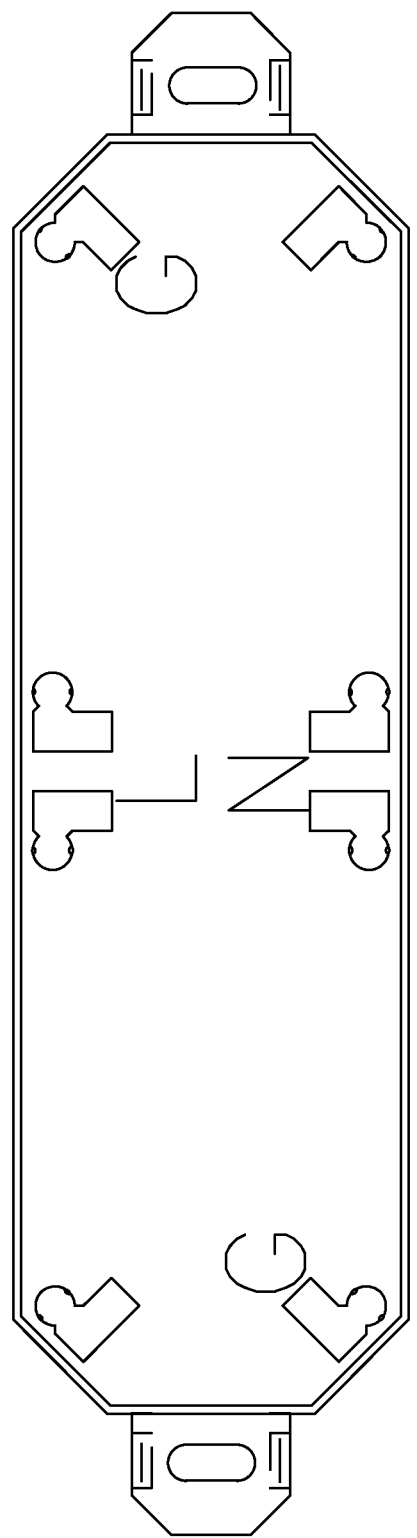
FIG. 3 depict the front view of the embodiment according to the invention.
Figure 4:
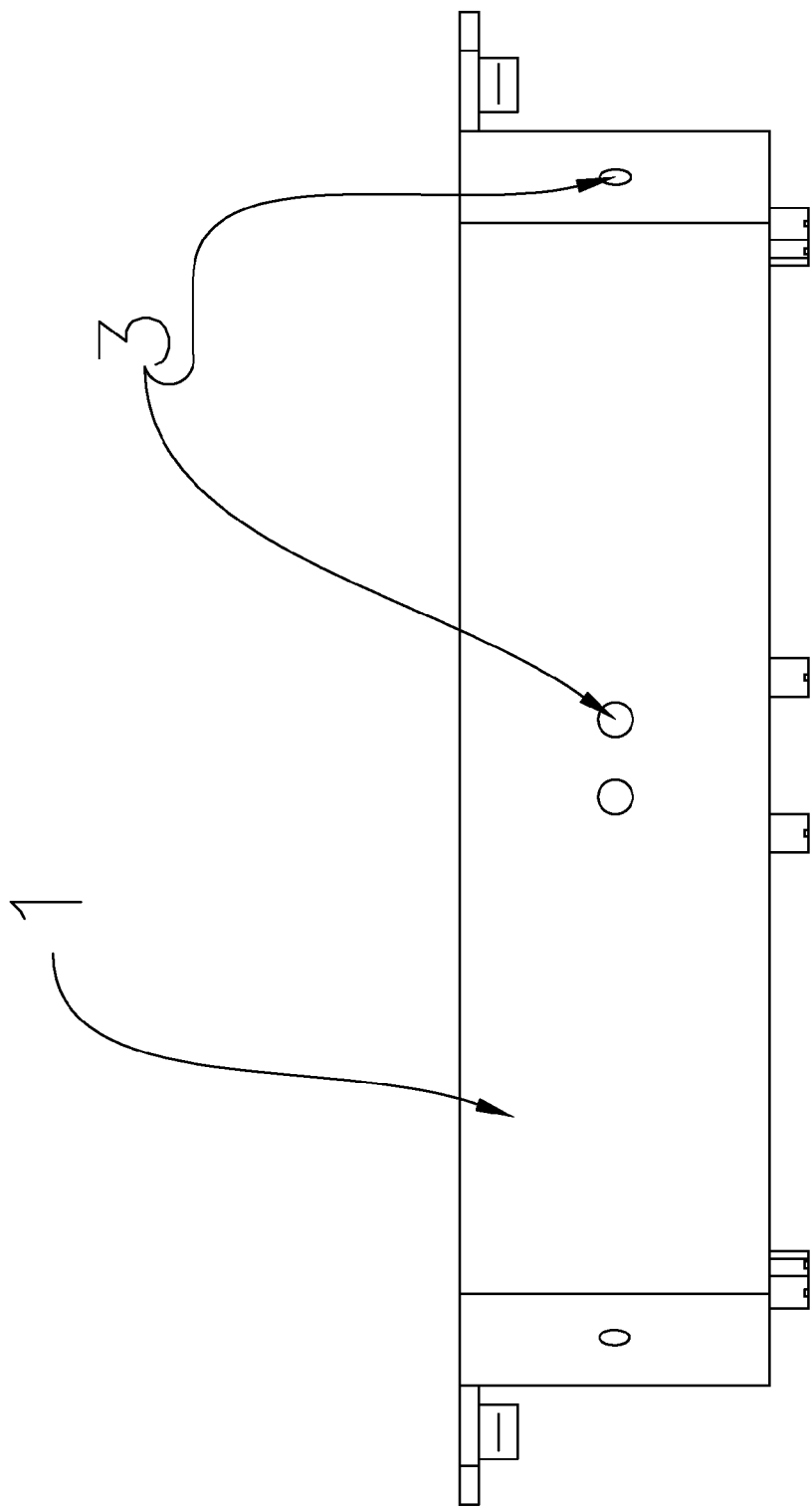
FIG. 4 depict the both side view of the embodiment according to the invention.
Figure 5:
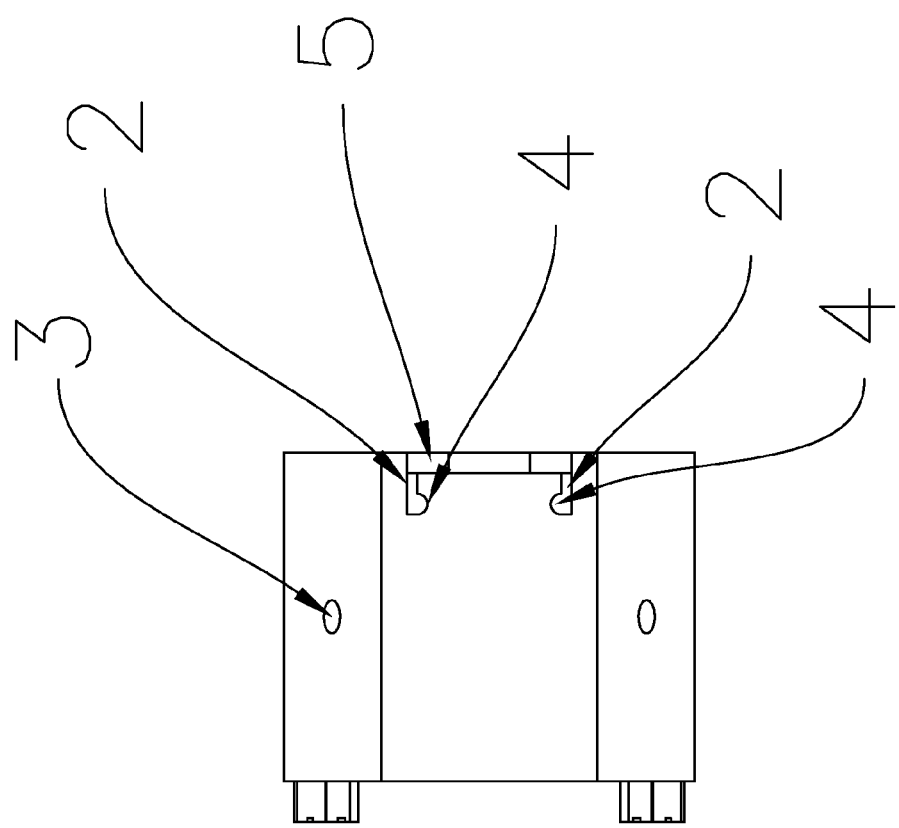
FIG. 5 depict the top and bottom view of the embodiment according to the invention.
Figure 6:
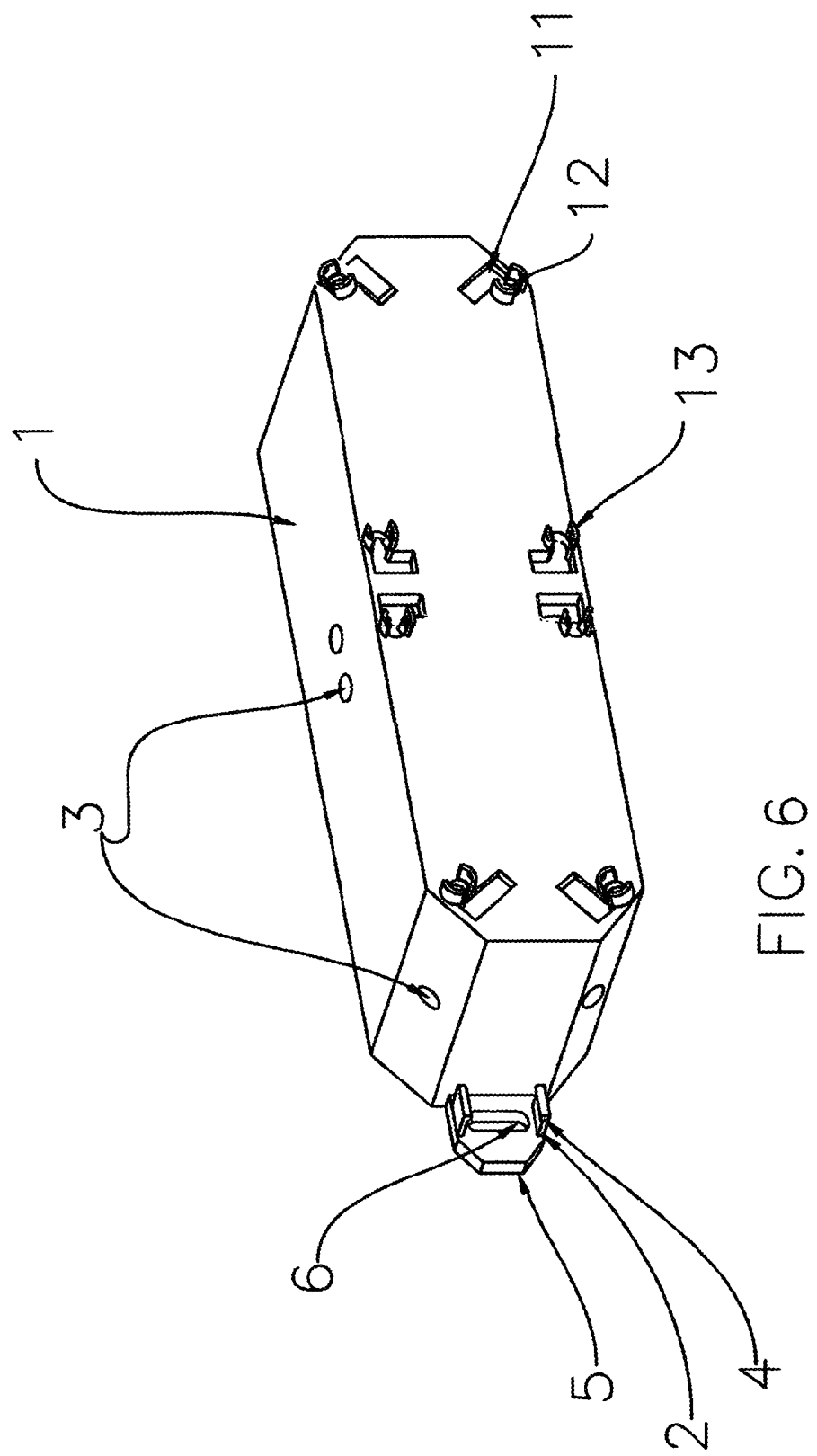
FIG. 6 depicts a rear perspective view of the embodiment according to the invention.

Referring to the present invention provide an electrical safety apparatus for preventing electrical shortages, shocks and wire movement hence preventing breakage and wire becoming loose. Whereas the cassu-guard the invention in which presented is a molded structure the case 1 is provide with wire slots 11 and lock slots 12 whereas to insert wires through that will be connected to electrical socket outlets and light switches which the wires are then place in the lock that are held firmly by the provided grip arms 13 which carry grip nipples 14 at tips.

The invention also provide with lead holes 3 for enable access for by instrument leads to be inserted during testing and inspections.

The invention also provide on each side screw flops 5 with screw insert 6 with fastening flops 2 with clip tip 4 at the end of each fastening flops 2.

The invention claimed is:

1. A safety insert device for preventing electrical shortages and electrical shocks and for securing wiring, the safety insert device comprising:

an open-faced electrically-insulative box sized to receive an electrical device while simultaneously sized to releasably and insertably attach to an electrical junction box, the open-faced electrically-insulative box comprising:

a back wall having an outside surface and an inside surface, the outside surface facing away from an electrical device when inserted into the open-faced electrically-insulative box, and the inside surface facing toward the electrical device when inserted into the open-faced electrically-insulative box, the back wall comprising a plurality of wire-access apertures extending through the back wall between the outside surface and the inside surface, each aperture defining an L-shape opening in the back wall, each L-shaped wire-access aperture having an elongated slotted wire-insertion region which corresponds to a long segment of the L-shape, and a wire-retention region which corresponds to a short segment of the L-shape, each wire-retention region being sized to securely grip an inserted electrical wire, wherein each wire-retention region comprises grip arms, wherein each grip arm projects substantially perpendicular from the outside surface of the back wall, wherein each grip arm has an inwardly-facing surface and an outwardly-facing surface, the inwardly-facing surface facing toward the electrical wire when inserted into the wire-retention aperture, and the outwardly-facing surface facing away from the electrical wire when inserted into the wire-retention aperture, each grip arm having a grip nipple which projects from the inwardly facing surface of the grip arm to retain the electrical wire when inserted into the wire-retention aperture; and, a plurality of side walls, each of the plurality of side walls having an outside surface and an inside surface, the outside surface of each side wall facing away from an electrical device when inserted into the open-faced electrically-insulative box, and the inside surface of each side wall facing toward the electrical device when inserted into the open-faced electrically-insulative box.

2. The safety insert device of claim 1, wherein the electrical wire comprises an electrical conductor.

3. The safety insert device of claim 1, wherein the electrical junction box is a metallic box.

4. The safety insert device of claim 1, further comprising of a plurality of test apertures, each one of the plurality of test apertures extending through one of the plurality of side walls between the outside surface and the inside surface of the side wall.

5. The safety insert device of claim 1, wherein the electrical device is an electrical outlet.

6. The safety insert device of claim 1, wherein the electrical device is an electrical switch.

7. The safety insert device of claim 1, wherein the elongated slotted wire insertion regions has a length and a width, the width sized to permit an wire to freely project through and slide within the elongated slotted wire insertion region.

8. The safety insert device of claim 1, wherein each of the plurality of side walls has a front edge and a back edge, wherein the back edge of each of the plurality of side walls connects to the back wall, and the front edge being the distal edge from the back edge, wherein the open-faced electrically-insulative box further comprises two electrical junction box connection tabs, a first tab projecting substantially perpendicular from the front edge of a top wall, the top wall being one of the plurality of side walls, and a second tab projecting substantially perpendicular from the front edge of a bottom wall, the bottom wall being one of the plurality of side walls, wherein the top wall and bottom wall are opposite one another, wherein each of the electrical junction box connection tabs have a front surface and a back surface, the front surfaces of the electrical junction box connection tabs being substantially planar with each other and with the front edge of each of the plurality of side walls, the back surface of the electrical junction box connection tabs facing substantially the same direction as the outside surface of the back wall.

9. The safety insert device of claim 8, wherein each of the electrical junction box connection tabs comprises a slotted screw aperture extending through the electrical junction box connection tab between the front surface and the back surface of the electrical junction box connection tab, each screw aperture configured to permit a screw to project through the slotted screw aperture and thread into a threaded hole in the electrical junction box.

10. The safety insert device of claim 8, wherein each of the electrical junction box connection tabs comprises two fastening flops, each having a clip tip, wherein the two fastening flops project substantially perpendicular from the back surface of the electrical junction box connection tab, each fastening flop projects from opposite sides of the electrical junction box connection tab, each clip tip projecting substantially perpendicular for the fastening flop, wherein the two clip tips project from each of the fastening flops project toward each other.

\* \* \* \* \*